United States Patent [19]

Brunn

[11] 4,196,286
[45] Apr. 1, 1980

[54] PROCESS FOR THE MANUFACTURE OF BASIC OXAZINE DYESTUFFS

[75] Inventor: Erwin Brunn, Grenzach-Wyhlen, Fed. Rep. of Germany

[73] Assignee: Ciba-Geigy Corporation, Ardsley, N.Y.

[21] Appl. No.: 862,881

[22] Filed: Dec. 21, 1977

Related U.S. Application Data

[63] Continuation of Ser. No. 702,552, Jul. 6, 1976, abandoned.

[30] Foreign Application Priority Data

Jul. 11, 1975 [CH] Switzerland ............... 9098/75

[51] Int. Cl.² .................................... C07D 265/28
[52] U.S. Cl. ............................................... 544/103
[58] Field of Search ..................................... 544/103

[56] References Cited

U.S. PATENT DOCUMENTS

| | | | |
|---|---|---|---|
| 3,681,347 | 8/1972 | Herz et al. | 544/103 |
| 3,806,504 | 4/1974 | Mundlos et al. | 544/103 |
| 3,894,012 | 7/1975 | Baumann et al. | 544/103 |
| 3,928,339 | 12/1975 | Mundlos et al. | 544/103 |
| 3,972,879 | 8/1976 | Psaar | 544/103 |
| 4,018,763 | 4/1977 | Moser et al. | 544/103 |

FOREIGN PATENT DOCUMENTS

| | | |
|---|---|---|
| 1569604 | 8/1970 | Fed. Rep. of Germany. |
| 2036034 | 12/1970 | France. |
| 2124306 | 9/1972 | France. |
| 2249133 | 5/1975 | France. |
| 1358488 | 7/1974 | United Kingdom. |

*Primary Examiner*—John M. Ford
*Attorney, Agent, or Firm*—Prabodh I. Almaula

[57] ABSTRACT

Process for the manufacture of a basic oxazine dyestuff of the formula (1)

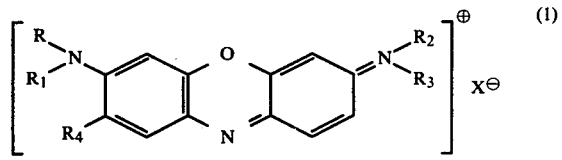

in which R, $R_2$ and $R_3$ denote alkyl with 1 to 4 carbon atoms and $R_1$ denotes H or alkyl with 1 to 4 carbon atoms, or R and $R_1$, or $R_2$ and $R_3$, conjointly with the amine nitrogen also form a saturated 5-membered or 6-membered ring, which optionally contains further hetero-atoms, $R_4$ denotes H or methyl and $X^\ominus$

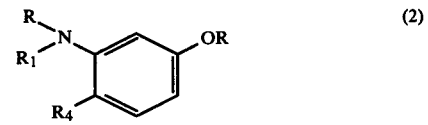

in which the R's, independently of one another, and $R_1$ and $R_4$ have the meaning indicated under formula (1), is nitrosylated in a cyclic ether, sulpholane or an alkyl-substituted amide, optionally mixed with water or an aliphatic alcohol, and the resulting suspension, which contains the nitroso compound, is subjected, without intermediate isolation of the said nitroso compound, to a condensation reaction with an aminophenol of the formula (3)

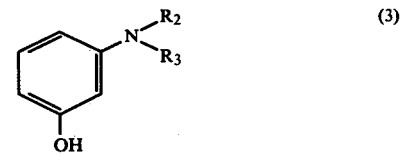

in which $R_2$ and $R_3$ have the meaning indicated under formula (1).

5 Claims, No Drawings

PROCESS FOR THE MANUFACTURE OF BASIC OXAZINE DYESTUFFS

This is a continuation application Ser. No. 702,552, filed on July 6, 1976, now abandoned.

The invention relates to a novel process for the manufacture of basic oxazine dyestuffs.

As is known, the manufacture of basic oxazine dyestuffs is carried out in two stages, nitroso compounds first being manufactured from aromatic amines and then being isolated and subjected to a condensation reaction with aminophenols. However, these known processes are subject to the disadvantage that they are carried out in separate process steps and that it is possible to handle the toxic nitroso compound only when safety measures are rigorously enforced since this compound causes severe damage to the skin in many peple.

In order to eliminate these disadvantages, it is proposed in DOS No. 1,569,604 to manufacture basic oxazine dyestuffs in a single stage process, without isolation of the nitroso compound, in such a way that, starting from an aminophenol ether, this is nitrosylated in an aqueous-alcoholic solution at a temperature of 0° to +3° C. and the nitroso compound is then subjected, in suspension, to a condensation reaction with an aminophenol to give the oxazine dyestuff.

A further novel single stage process for the manufacture of oxazine dyestuffs has now been found which, compared with the process described in the said German Offenlegungsschrift, has the advantage that it can, surprisingly, be carried out at room temperature, which is more economical and results in a substantial saving in energy and in an increase in the synthesis capacity.

The new process according to the invention is characterised in that basic oxazine dyestuffs of the general formula (1)

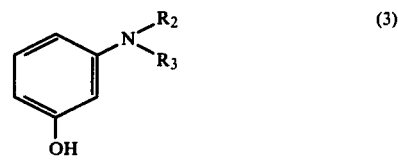

wherein R, $R_2$ and $R_3$ denote alkyl with 1 to 4 carbon atoms and $R_1$ denotes H or alkyl with 1 to 4 carbon atoms, or R and $R_1$, or $R_2$ and $R_3$, conjointly with the amine nitrogen also form a saturated 5-membered or 6-membered ring, which optionally contains further hetero-atoms, such as, for example, a morpholine, piperidine or pyrrolidine ring, $R_4$ denotes H or methyl and $X^{\ominus}$ denotes an anion, preferably a chlorine ion or a $ZnCl_3^-$ ion, are manufactured when a compound of the formula (2)

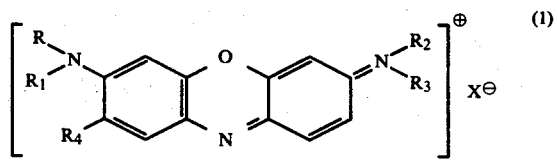

wherein the R's, independently of one another, and $R_1$ and $R_4$ have the meaning indicated under formula (1), is nitrosylated in a cyclic ether, sulpholane or an alkyl-substituted amide, optionally mixed with water or an aliphatic alcohol, and the resulting suspension, which contains the nitroso compound, is subjected, without intermediate isolation of the said nitroso compound, to a condensation reaction with an aminophenol of the formula (3)

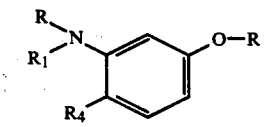

wherein $R_2$ and $R_3$ have the meaning indicated under formula (1). After the condensation reaction, the dyestuff precipitates out or, advantageously, is precipitated, appropriately in the form of the chloride or chlorozincate.

Particularly good results are obtained with compounds of the formulae (2) and (3) wherein R, $R_1$, $R_2$ and $R_3$ each denote the $C_2H_5$ group and $R_4$ denotes hydrogen.

The process according to the invention, which is distinguished by its great simplicity and economy, in detail proceeds in such a way that the compound of the formula (2) is first nitrosylated. This is effected at room temperature say between 20° and 25° C., in a solvent which consists either of a cyclic ether, such as dioxane, tetrahydrofurane or sulpholane (cyclic sulphone) or of an acid amide which is substituted by alkyl and in particular is N,N-disubstituted, such as dimethylformamide, dimethylacetamide, N-methylpyrrolidone or hexamethylphosphoric acid triamide or consists of a mixture of one of these solvents with water or a low-molecular alcohol, such as methanol, ethanol, propanol, isopropanol or glycol. If a mixture of solvents, say of a cyclic ether and water, such as, in particular, a mixture of dioxane/water, is used, there can be between 70 and 99 parts of dioxane and between 30 parts and 1 part of water per 100 parts of total volume. The best ratio, from the point of view of economy also, is the azeotropic mixing ratio. In the case of the dioxane/water azeotrope this is a composition of 82:18.

The nitrosylation, which can be carried out with the customary nitrosylating agents, such as, for example, sodium nitrite, is also carried out in the presence of an acid, especially hydrochloric acid or sulphuric acid, and this acid, generally also suffices to keep the reaction mixture acid during the condensation reaction which follows the nitrosylation.

Compounds of the formula (2) which can be used are, above all: 1-dimethylamino-phenyl 3-methyl ether, 1-diethylamino-phenyl 3-ethyl ether, 1-dipropylamino-phenyl 3-butyl ether, 1-ethylmethylaminophenyl 3-methyl ether, 1-N-pyrrolidinophenyl 3-methyl ether, 1-N-piperidinophenyl 3-ethyl ether, 1-N-morpholinophenyl 3-ethyl ether and 1-ethylamino-6-methylphenyl 3-ethyl ether.

The condensation reaction of the resulting nitroso compound which is not to be isolated, with the compound of the formula (3), which advantageously is added in a 5 to 10% excess, relative to the compound of the formula (2), is appropriately carried out in the same solvent as the nitrosylation by, prior to the addition, buffering the pH value, if necessary, to about 3 to 4 by adding buffer substances. The actual condensation reaction to give the oxazine dyestuff of the formula (1) takes place at elevated temperature, in particular between 70° and 75° C.

Compounds of the formula (3) which can be used are, for example; 3dimethylaminophenol, 3-diethylaminophenol, 3-dibutylaminophenol, 3-N-pyrrolidinophenol, 3-N-piperidinophenol, 3-N-morpholinophenol and 3-ethylmethylaminophenol.

The solvent for the nitrosylation and the subsequent condensation reaction can then be recovered again and added to the process anew. It is particularly advantageous when an azeotropic mixture is used.

In many cases, the oxazine dyestuff of the formula (1) is obtained virtually quantitatively, in a crystalline form and in very high purity and in other cases the product is isolated by distilling off the solvent and precipitating the dyestuff from the solution, so that in both cases a dyestuff with a high colour strength is obtained. Moreover, no special isolation and purification processes are necessary.

Oxazine compounds of the formula (1), which in themselves are known and which are suitable for dyeing or printing, for example, mordanted cellulose fibres, silk, leather or fully synthetic fibres, such as acetate rayon, polyamide fibres or acid-modified polyamide or polyester fibres, but especially polyacrylonitrile and also fibres obtained from polyvinylidene cyanide, are obtained by the process according to the invention.

In the example which follows, which illustrates the invention without restricting it thereto, the temperatures are quoted in degrees centigrade.

EXAMPLE 160 ccs of dioxane with an 18% content are initially introduced into a 750 ccs flask which has a dropping funnel and a stirrer, 59.1 g of 3-diethylaminophenetol of the formula

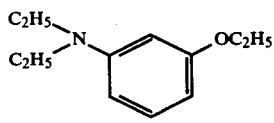

are then introduced and 25.8 g of 100% strength hydrochloric acid are added. During the addition, the temperature is kept at about 20°. The mixture is then nitrosylated in the course of 30 minutes by running in 23 g of sodium nitrite and, during this time, the temperature is kept between 20° and 25° by means of external cooling. The resulting yellow-brown solution is stirred for 30 minutes at about 20° to 25° in orderto precipitate the product. The pH value is buffered to 3.0 to 3.5 by adding about 2.4 g of sodium carbonate.

175 ccs of dioxane with an 18% water content are initially introduced into a separate 750 ccs flask which has a dropping funnel, a stirrer and a reflux condenser and 55.0 g of 3-diethylaminophenol of the formula

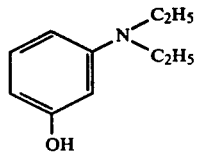

are introduced. The mixture is warmed to 70° to 75° and, at this temperature, the suspension obtained from the nitrosylation is allowed to flow in at a uniform rate in the course of 3 hours, whilst stirring well. The mixture is then allowed to cool to about 50° C. and about 5.7 g of hydrochloric acid are added, the pH value being adjusted to about 2.5. 25 g of zinc chloride and 20 g of sodium chloride are introduced at a temperature of about 50° C. The dyestuff of the formula

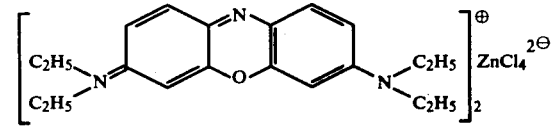

crystallises out as green iridescent prisms.

The mixture is cooled to 25° C. and stirred for one hour at this temperature and the dyestuff is filtered off and dried at about 100° C.

If the procedure is analogous to that indicated in the example but, instead of 160 ccs of aqueous dioxane, equal amounts of sulpholane or tetrahydrofurane, N-methylpyrrolidone, hexamethylphosphoric acid triamide or dimethylacetamide are used, the dyestuff is obtained in equally good yield (~80 to 85%) and quality.

What is claimed is:

1. A process for the manufacture of a basic oxazine dyestuff of the formula

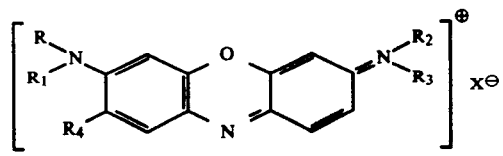

wherein
R, $R_2$ and $R_3$ are alkyl of 1 to 4 carbon atoms and
$R_1$ is H or alkyl of 1 to 4 carbon atoms, or
R and $R_1$, or $R_2$ and $R_3$, conjointly with the nitrogen to which they are attached, form a pyrrolidine, piperidine or morpholine ring,
$R_4$ is H or methyl and
$X^\ominus$ is an anion, which is CL or $ZnCl_3$ wherein a compound of the formula

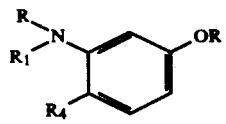

is treated with a nitrosylating agent in the presence of an hydrochloric acid or sulphuric acid at room temperature in a solvent, wherein the solvent is a cyclic ether, sulpholane or an alkyl-substituted amide, alone or mixed with water or an aliphatic alcohol, to form a suspension containing the corresponding nitroso compound, and reacting said nitroso compound, without isolation from said suspension, with an aminophenol of the formula

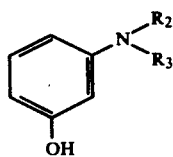

in a condensation reaction by heating at an elevated temperature of 70° to 75° C. to form said basic oxazine dyestuff.

2. A process according to claim 1, wherein R, $R_1$, $R_2$ and $R_3$ each represent $-C_2H_5$ and $R_4$ is hydrogen.

3. A process according to claim 1, wherein the solvent is a mixture of water and a cyclic ether in a volume ratio of 1 to 30 parts of water and 70 to 99 parts of the cyclic ether.

4. A process according to claim 3, wherein the ratio of water to cyclic ether is the azeotropic distillation ratio.

5. A process according to claim 4, wherein a dioxane/water azeotrope is used as the solvent.

* * * * *